Jan. 19, 1926. 1,569,924

W. E. HALE

DRAG SCRAPER BACK POST BLOCK

Filed Nov. 14, 1922

WITNESS:

INVENTOR
William E. Hale
BY
Augustus B. Stoughton
ATTORNEY.

Patented Jan. 19, 1926.

1,569,924

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

DRAG-SCRAPER BACK-POST BLOCK.

Application filed November 14, 1922. Serial No. 600,791.

*To all whom it may concern:*

Be it known that I, WILLIAM E. HALE, a citizen of the United States, residing at Fort Washington, in the county of Montgomery and State of Pennsylvania, have invented a new and useful Improvement in Drag-Scraper Back-Post Blocks, of which the following is a specification.

The gear that is connected with the back posts including the blocks forming part of that gear or tackle operates to resist the strain incident to the power applied to the scraper and to the resistance offered to the scraper in doing its work, and this strain is frequently an impact strain which practically requires to be cushioned or absorbed.

The present invention is based on the discovery that the foregoing is the cause of a great deal of breakage in such gear or tackle, and its principal object is to provide a block by the use of which such effects and disadvantages are obviated.

The invention comprises the combination and arrangement of parts hereinafter described and finally claimed.

In the following description reference will be made to the accompanying drawings forming part hereof and in which—

Figure 1:
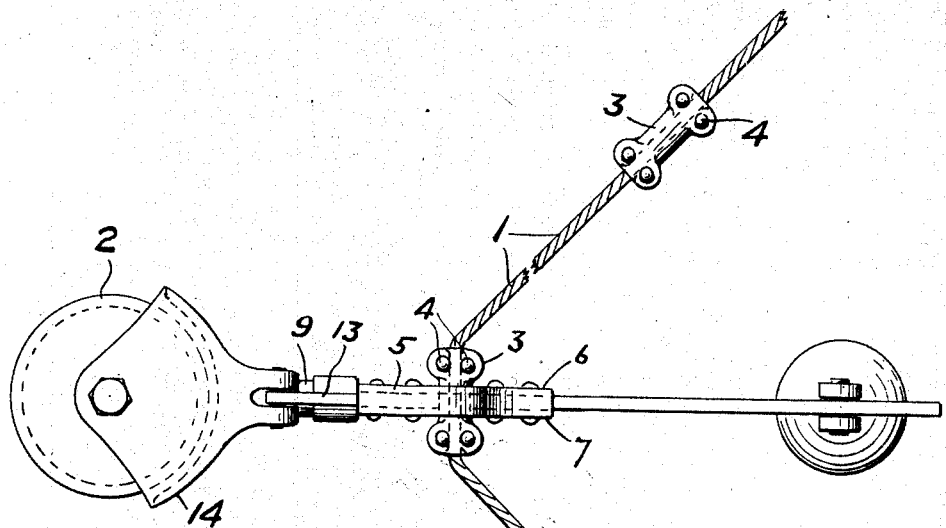
Figure 1 is a top or plan view.
Figure 2:
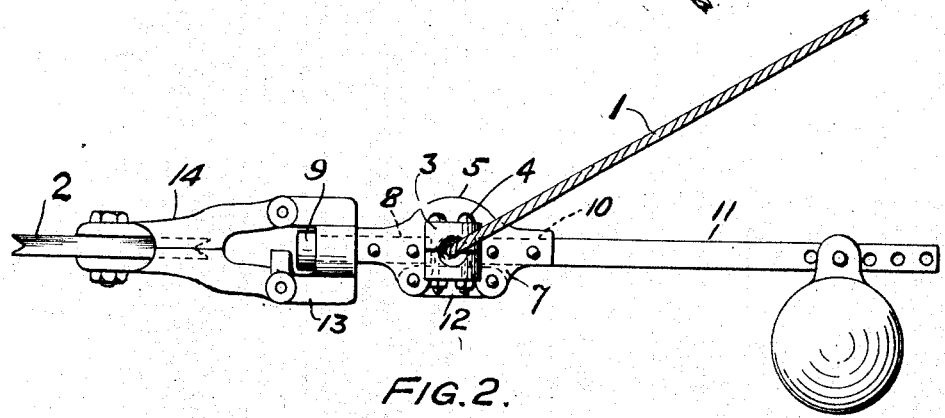
Fig. 2 is a side or elevational view.

In the drawings 1 is a wire rope or cable which is secured at its ends to the back posts of a drag scraper gear. The back posts are not shown because they are too well understood to require illustration and they are usually arranged at the edge of the ground or enclosure upon the surface of which the scraper is operated by power applied to it by means of a line or chain passing around the sheave 2. The scraper is not shown because it and the means by which power is applied to it are too well understood to require illustration. 3 are spools secured to the wire rope or cable 1 at appropriate intervals where it may be desired to attach the block. The spools are divided into two parts in lengthwise direction and the two parts are detachably secured together as by means of fastenings or bolts 4. Mounted on the spool is a saddle 5 shaped on its underside to conform to the middle part of the spool and also constructed on its underside with spaced ears 6 and 7. Between these ears 6 and 7 are arranged and bolted or otherwise secured the shank 8 of a swivel pin 9, the shank 10 of a counterweight arm 11, and a locking plate 12 which secures the saddle to the spool and itself conforms to the body of the spool. The shackle 13 is mounted on the swivel 9 and carries the block housing 14 in which the sheave 2 is turnably mounted.

Evidently an impact strain received at the sheave 2 is transferred to the wire rope or cable 1, which by reason of its elasticity absorbs the strain and so protects the various parts of the device from breakage. The bore through the spool may flare at its ends and the spool is a most convenient means by which the wire rope or cable can be arranged through the body of the block, and the spool permits of the use of the described saddle which, by removing the locking bar 12 can be readily transferred from spool to spool in cases where a plurality of spools are provided on the wire rope or cable. It has already been said that the locking bar 12 is bolted between the ears 6 and 7, and to remove the bar 12 the bolts, or at least one of them, is taken out. Furthermore the saddle simplifies the construction of the block as a whole and may be in turnable relation with the spool.

It will be obvious to those skilled in the art to which the invention relates that modifications may be made in details of construction and arrangement without departing from the spirit of the invention which is not limited as to those matters or otherwise than as the prior art and the appended claims may require.

I claim:

1. In drag scraper gear the combination with a back post block of a wire rope or cable, two-part spools, fastenings for connecting the two parts of the spools to secure the latter to the wire rope or cable, a saddle shaped to conform to the middle part of a spool and turnable thereon, and a locking plate for the saddle.

2. In a drag scraper gear the combination of a wire rope or cable, a spool through which the cable is reeved, and a saddle mounted on and embracing the spool and provided with a counterweight arm and counterweight and with a swivel and pulley.

3. In a drag scraper gear the combination of a wire cable, a sectional spool through which the cable is reeved, a saddle mounted on and conforming to the spool and provided with spaced ears, a shackle shank and a counterweight arm and a locking plate arranged between the ears, and a pulley connected with the shackle shank.

4. In a drag scraper gear the combination of a wire rope or cable, spools through which the cable is reeved and which are secured to the cable in spaced relation, and a pulley block shank element adapted to detachably embrace the spools.

5. In a drag scraper gear the combination of a wire rope or cable, a spool through which the rope or cable is reeved and which is secured to the rope or cable, and a pulley block shank element embracing the spool.

WILLIAM E. HALE.